Patented June 1,716,606

UNITED STATES PATENT OFFICE.

WALTER O. SNELLING, OF ALLENTOWN, PENNSYLVANIA.

FURFURAL REACTION PRODUCT.

No Drawing. Original application filed January 10, 1925, Serial No. 1,554. Divided and this application filed May 25, 1926. Serial No. 111,646.

My invention relates to furfural reaction products and has as its principal object the preparation from furfural of highly porous non-resinous products of the general nature of charcoal, and possessing very desirable physical and chemical properties.

I have discovered that it is possible by suitable chemical means to partly withdraw the hydrogen and the oxygen present in the furfural molecule so as to obtain from furfural a charcoal-like product possessing unique and valuable properties. By my invention I am able to obtain from furfural porous non-resinous products having advantageous properties for the preparation of porous membranes for chemical work and for many other purposes, and by suitable modification of my dehydrating process I am able to modify the absolute porosity, the size of pore space and the other physical characteristics of my porous bodies over a wide range, so that a series of products useful for a variety of purposes may be obtained.

My present invention rests upon my discovery that in the presence of water the very vigorous action of chemical dehydrating agents upon furfural may be modified and controlled, and the elements of water may be withdrawn from the furfural molecule in a slow and orderly way to produce a series of porous charcoal-like products. In the furfural molecule there are five carbon atoms, four hydrogen atoms and two oxygen atoms, and by the application of my invention I can progressively withdraw the hydrogen atoms and the oxygen atoms to produce water and leaving carbon in the form of charcoal. I may carry my dehydrating reaction practically to completion so as to leave a product containing very little volatile material and consisting essentially of free carbon, or I may interrupt my dehydrating step at any desired intermediate point in the progressive dehydration, so as to leave products possessing primarily a charcoal structure, but containing some incompletely dehydrated furfural products.

As an example of my present invention I will describe a method which I may employ in the preparation from furfural of a porous cup having desirable properties as a substitute for the unglazed porcelain porous cups now commonly used. To 60 parts by weight of anhydrous furfural, I add 25 parts by weight of water and 15 parts by weight of anhydrous hydrochloric acid. It will of course be evident that instead of anhydrous furfural and anhydrous hydrochloric acid I may use commercial furfural containing a few percent of water and ordinary commercial aqueous hydrochloric acid solutions, providing the amounts and strengths of these aqueous solutions is such as to give a final mixture possessing the stated proportions of furfural, hydrochloric acid and water. After thoroughly mixing the ingredients named, so as to secure complete incorporation, the mixture is poured into a mold of the form which is desired for the finished porous cup, and is then left quietly for a period of seven days, during which time a progressive dehydration of the furfural occurs. If the proportions stated above have been followed an entirely non-resinous black charcoal-like solid of very porous nature will gradually be formed as a result of the controlled dehydrating action of the hydrochloric acid in the presence of the water existing in the mixture, and at the end of seven days the solid reaction mixture may be removed from the mold, and thoroughly washed with water to remove the contained hydrochloric acid. The washing of the molded product should be quite thorough, and the porous cup should preferably be left in running water for from two or four days, to permit of the complete removal of water soluble products. Upon the completion of this washing treatment the porous cup may be dried, and will be found to possess exceptional porosity and evenness of pore size.

As the dehydration of furfural as the result of the action of a dehydrating agent when controlled by the presence of an aqueous fluid is a slow progressive reaction, it will be evident that the reaction may be controlled not only by the relative proportions of furfural, dehydrating agent and water which are present, but also by the time factor represented by the period of dehydration. When very porous reaction products are desired, these may be produced either by the use of mixtures relatively low in furfural, but employing a relatively long period of hydration, or by the use of mixtures much higher in furfural, but employing a relatively short period of hydration so that undehydrated furfural is left in the product at the time that it is washed. It will of course be evident that the washing step results in the removal of all water-soluble products and the consequent arresting of any further formation of charcoal or like highly carbonaceous reaction products.

By suitable modifications of the principal variables involved in my dehydration reaction, I am able to prepare bodies differing materially in apparent density, porosity, and average size of pore space. The principal variables which I prefer to use in controlling the porosity and other characteristics of my products are the ratio of hydrochloric acid to water, the ratio of furfural to the sum of the hydrochloric acid and the water present, and the time permitted for reaction before arresting further dehydration by the addition of a large excess of water. In general I obtain the most satisfactory products for use as pigments when employing mixtures in which anhydrous furfural represents from 65% to 90% of the entire mixture, anhydrous hydrochloric acid represents from 3% to 10% and water represents from 5% to 30% of the entire mixture. In the preparation of porous chemical vessels I obtain satisfactory results when anhydrous furfural represents from 40% to 65% of the entire mixture, anhydrous hydrochloric acid represents from 10% to 20% of the entire mixture, and water represents from 20% to 40% of the entire mixture. A product made in accordance with my present invention by the use of 60 parts of anhydrous furfural, 10 parts of anhydrous hydrochloric acid and 30 parts of water forms a desirable filling for cylinders containing compressed acetylene absorbed in a solvent. A product made by the use of 50 parts of anhydrous furfural, 20 parts of anhydrous hydrochloric acid and 30 parts of water forms a porous mass having desirable properties as a carrier for catalytic bodies. In general I prefer to have my furfural constitute from 35% to 90% of my entire mixture, and water representing from 5% to 50% of the entire mixture, and I obtain satisfactory results by the use of a dehydration period of from a few hours, in the case of mixtures high in furfural and hydrochloric acid and relatively low in water content, up to a dehydration period of 30 days, in the case of mixtures high in water and relatively low in furfural and hydrochloric acid content. For mixtures containing in excess of 70% by weight of furfural it is desirable to have water and hydrochloric acid present in approximately equal amounts, the amount of acid not being in excess of the amount of water present. For mixtures containing 50% or less by weight of furfural water should be present to the extent of from two to four times the amount of hydrochloric acid present. A large excess of water greatly reduces the rate of dehydration, and where a considerable amount of water is used a long dehydration period is desirable. The amount of water in the mixture should not be less than 5% of the entire mixture and preferably should exceed 10% of the mixture.

As an example of a special form of my invention adapted to the preparation of pigment crayons, I may take 70 parts by weight of anhydrous furfural, 10 parts by weight of anhydrous hydrochloric acid and 20 parts by weight of water, the three constituents being thoroughly mixed together. The mixture may be conveniently poured into molds having the desired form of the finished crayons, and allowed to dehydrate for five days, after which period the solid charcoal-like product is removed from the mold and soaked in water until all water-soluble products have been removed. The crayons may now be impregnated with any suitable fat or wax, to give a product having great depth of color, and suitable for use as an artist's crayon. As the preparation of crayons has been specifically described and claimed in my pending application S. N. 1,554, of which the present application is in part a division and is in part a continuation, I am not specifically claiming in the present application the step of impregnating with a fat or wax the charcoal-like products obtained in the practice of my invention.

When products entirely free from volatile constituents are desired, I find it preferable to the use of a very long period of dehydration to employ only a moderate period of dehydration such as three or four days for example, and then to heat the resulting solid reaction product, after first carefully washing to remove all water-soluble constituents, until all volatile materials have been expelled. In making porous cups and battery electrodes, for example, I find it convenient to first prepare porous products of desired hardness and porosity by the methods of control herein described, these products being then heated to a red heat in an atmosphere of any suitable inert gas. The products prepared in accordance with my present invention have, without special activation, a fair measure of absorptive ability, but their absorptive capacity may be greatly increased by activation by the methods commonly used in the activation of other forms of charcoal.

As charcoal cannot ordinarily be prepared from liquids by the action of heat, owing to the volatility of most liquids under such conditions, and as charcoal is not produced from furfural by the usual pyrogenic reactions, my invention represents a means of obtaining a charcoal-like body of different structure than any charcoal previously known, and having unique properties of activity and porosity as a result of such structure.

By my inventon I am able to control both the degree of porosity and the size of the pores in my reaction products through a very wide range, high water content and high hydrochloric acid content tending to produce large pores, and high furfural content giving small pores. The ability to control the size of the pores and the percentage of pore space which is possible in accordance with my present invention is very important in the production of filtering plates and filtering tubes of controlled porosity and controlled pore size. Control of porosity is also important in preparing decolorizing bodies, acetylene solvent absorbents, bodies useful as pigments, and catalytic bodies and carriers for catalysts. By heating and activating porous bodies made in accordance with my present invention, either with or without the addition of a catalytic body such as platinum, palladium or nickel, very active catalytic products may be obtained. The products made by heating porous bodies made from furfural in the manner herein described, in the absence of air, have catalytic activity, and this activity may be increased by impregnating the porous body with a more active catalyst or by the well known processes used in activating charcoal.

Although I have referred specifically to the use of furfural, certain of the derivatives of furfural behave in a similar manner, and may be used as equivalents of furfural. As many variations may be made in my process without departing from the essential features of the disclosure as herein made, no limitations should be imposed upon my invention except as indicated in the appended claims.

I claim:

1. The process which comprises admixing furfural, hydrochloric acid and water and allowing the mixture to stand until a solid non-resinous reaction product has resulted.

2. The process which comprises admixing furfural, hydrochloric acid and water, allowing the mixture to stand until a solid non-resinous reaction product has resulted, and dissolving from such solid non-resinous reaction product water soluble substances therein present.

3. In the preparation of porous charcoal-like products, the process which comprises admixing from 35 parts to 90 parts of furfural with from 3 parts to 30 parts of hydrochloric acid and from 5 parts to 50 parts of water and allowing the mixture to stand until a solid non-resinous reaction product has resulted.

4. In the preparation of porous charcoal-like products, the process which comprises admixing from 35 parts to 90 parts of furfural with from 3 parts to 30 parts of hydrochloric acid and from 5 parts to 50 parts of water and allowing the mixture to stand until a solid non-resinous reaction product has resulted and thereafter removing from such solid non-resinous reaction product water soluble bodies therein present.

In testimony whereof, I have hereunto subscribed my name this 8th day of May, 1926.

WALTER O. SNELLING.